United States Patent [19]
Wilson

[11] Patent Number: 5,934,734
[45] Date of Patent: Aug. 10, 1999

[54] SLIDABLE SUN VISOR WITH SELECTIVELY ENGAGEABLE ANTI-BACKLASH DEVICE

[75] Inventor: Douglas J. Wilson, Burtchville, Mich.

[73] Assignee: Lear Corporation, Southfield, Mich.

[21] Appl. No.: 09/022,854

[22] Filed: Feb. 12, 1998

[51] Int. Cl.⁶ ........................................ B60J 3/02
[52] U.S. Cl. ........................................ 296/97.11
[58] Field of Search ........................................ 296/97.11

[56] References Cited

U.S. PATENT DOCUMENTS

| | | |
|---|---|---|
| 2,201,378 | 5/1940 | Schoenheit ........................... 296/97.11 |
| 2,221,182 | 11/1940 | Davis . |
| 2,279,542 | 4/1942 | Westrope . |
| 2,299,775 | 10/1942 | Westrope . |
| 2,441,780 | 5/1948 | Van Dresser ........................ 296/97.11 |
| 2,458,677 | 1/1949 | Brundage . |
| 3,008,758 | 11/1961 | McCormick . |
| 3,059,961 | 10/1962 | Jacobs . |
| 4,582,356 | 4/1986 | Kaiser et al. . |
| 4,921,300 | 5/1990 | Lawassani et al. . |
| 4,925,233 | 5/1990 | Clark . |
| 5,004,288 | 4/1991 | Viertel et al. . |
| 5,044,687 | 9/1991 | Abu-Shumays et al. . |
| 5,161,850 | 11/1992 | Redder et al. . |
| 5,409,285 | 4/1995 | Snyder et al. . |
| 5,466,077 | 11/1995 | Movaghar et al. . |
| 5,484,183 | 1/1996 | Rosa ...................................... 296/97.11 |
| 5,645,308 | 7/1997 | Fink ...................................... 296/97.11 |
| 5,653,490 | 8/1997 | Fink et al. ........................... 296/97.11 |

*Primary Examiner*—Gary C. Hoge
*Attorney, Agent, or Firm*—Brooks & Kushman PC

[57] ABSTRACT

A visor assembly includes a visor body, a support arm and an anti-backlash device for selectively applying a clamping force on the support arm. The anti-backlash device includes first and second bushings, each having an end surface misalignable and engageable with each other, and an inner surface portion slidably engageable with the support arm. When the inner surface portions are aligned with each other, the end surfaces are misaligned. The anti-backlash device further includes a spring means biasing the end surfaces together for urging the end surfaces to align, thereby causing the inner surface portions to misalign and to apply the clamping force on the support arm. Sufficient rotational movement of one of the bushings, against the bias of the spring means, sufficiently realigns the inner surface portions to sufficiently release the clamping force such that the visor body may slide along the support arm.

16 Claims, 4 Drawing Sheets

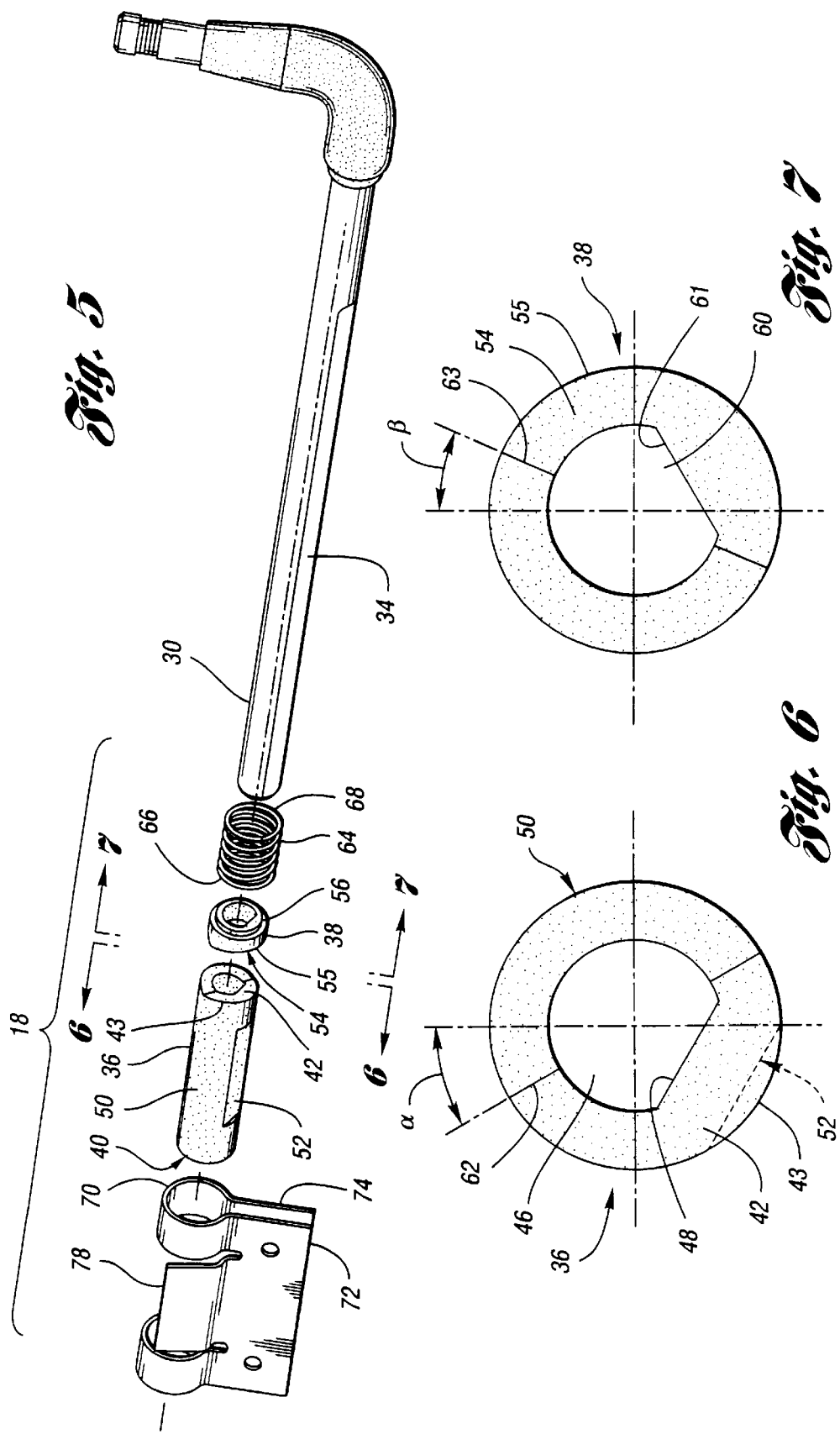

SLIDABLE SUN VISOR WITH SELECTIVELY ENGAGEABLE ANTI-BACKLASH DEVICE

TECHNICAL FIELD

This invention relates to a motor vehicle sun visor which is laterally adjustable and includes an anti-backlash device.

BACKGROUND ART

It is desirable in motor vehicles to provide a sun visor which slides adjacent the windshield or side window to provide different areas of effective sun blocking protection. Such slidable sun visors must minimize the slide effort of the visor, while still controlling lateral play and flutter during operation of the vehicle. Unfortunately, the tighter the design fit between mating surfaces of the visor assembly, the greater the slide effort typically must be. U.S. Pat. No. 5,161,850, for example, shows a visor assembly in which a visor body is laterally adjustable along a slide bar. The slide bar and the visor body each have a frictional engagement member for providing a frictional engagement force between each other. The frictional forces provided by both of the frictional engagement members, however, cannot be selectively applied and released, but rather are constant. As a result, the set, relatively high frictional forces must be overcome in order to slide the visor body along the slide bar. U.S. Pat. No. 5,409,285 shows another visor assembly in which the sliding frictional force cannot be selectively applied and released. Furthermore, as the tolerance fit between component parts increases from continued use, the amount of lateral play and flutter will likewise increase.

SUMMARY OF THE INVENTION

The sun visor assembly of the invention comprises a visor body, a support arm and an anti-backlash device supporting the visor body and slidably engageable with an end of the support arm. The anti-backlash device includes misalignable inner surfaces which selectively provide a clamping force on the end of the support arm when the inner surfaces are misaligned. Sufficient rotational movement of the visor body about the support arm sufficiently releases the clamping force of the anti-backlash device by sufficiently aligning the inner surfaces, such that the visor body may slide along the end of the support arm.

Accordingly, it is an object of the invention to provide a sun visor assembly including an anti-backlash device which selectively provides a clamping force along a support arm, such that lateral play and flutter of a visor body during operation of a vehicle are effectively controlled when the clamping force is applied.

It is another object of the invention to provide a sun visor assembly including an anti-backlash device which selectively provides a clamping force along a support arm, such that a visor body may slide along the support arm with minimal effort when the clamping force is released.

It is another object of the invention to provide a sun visor assembly including an anti-backlash device which compensates for a relatively large tolerance fit between component parts.

It is yet another object of the invention to provide a sun visor assembly including an anti-backlash device which self-adjusts to compensate for any tolerance variation that occurs during use.

A further more specific object of the invention is to provide an anti-backlash device, for use in a sun visor assembly, which includes misalignable engaging surfaces that selectively provide a clamping force along a support arm when the engaging surfaces are misaligned.

A still further more specific object of the invention is to provide an anti-backlash device, for use in a sun visor assembly, which includes first and second bushings, each having a misalignable end surface and an alignable inner surface portion; and a spring means for urging the end surfaces to align, thereby causing the inner surface portions to misalign and to apply a clamping force on a support arm.

The foregoing and other objects, advantages and features of the present invention will be more readily apparent to those skilled in the art after review of the best mode for carrying out the invention, taken together with the drawings.

BRIEF DESCRIPTION OF THE DRAWINGS

FIG. 5 is an exploded perspective view of the anti-backlash device showing first and second bushings;

FIG. 6 is an end view of the first bushing taken on line 6—6 of FIG. 5 in the direction of the arrows; and FIG. 7 is an end view of the second bushing taken on line 7—7 of FIG. 5 in the direction of the arrows.

BEST MODE FOR CARRYING OUT THE INVENTION

Figure 1:
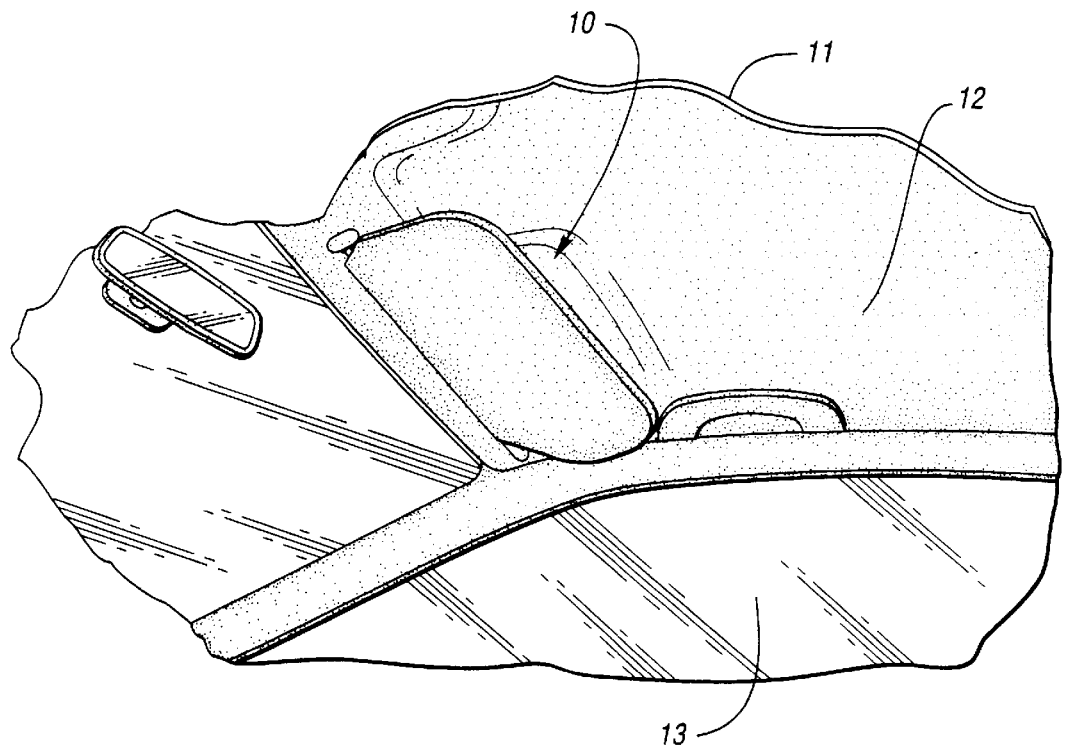
FIG. 1 is a perspective view of a sun visor assembly according to the present invention shown in a raised, stored position against a headliner of a vehicle.
Figure 2:
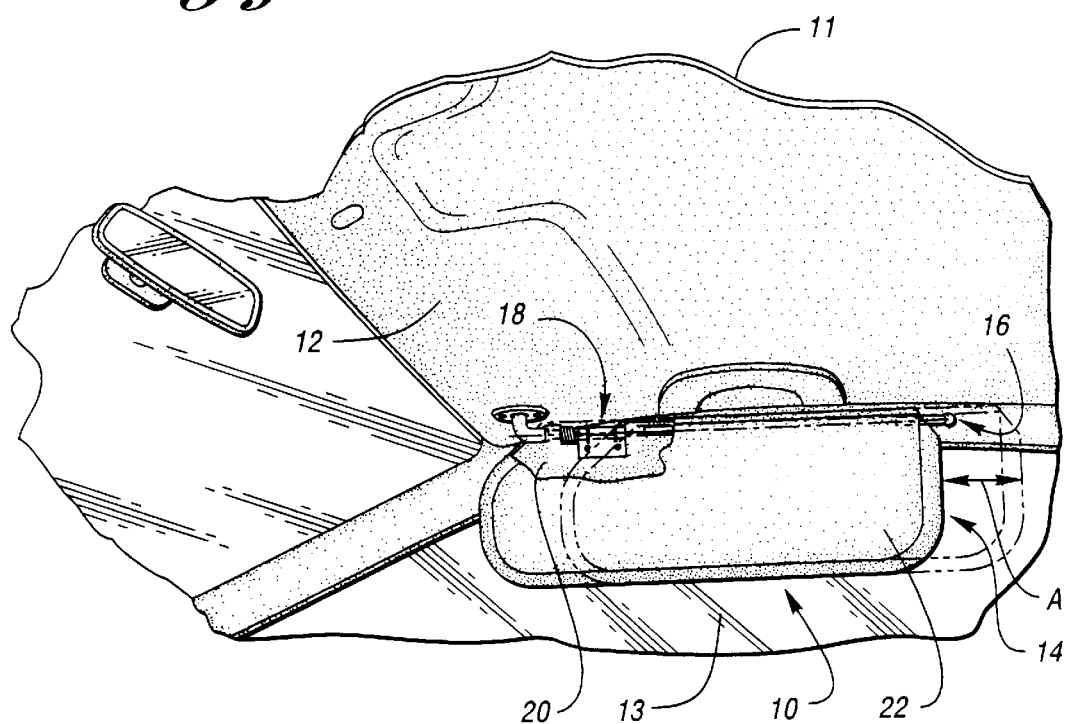
FIG. 2 is a perspective view of the sun visor assembly partly cut-away, and shown in a first side window use position in the vehicle, with a second side window use position shown in phantom.

With reference to the drawings, the preferred embodiments of the present invention will be described. FIGS. 1 and 2 show a slidable sun visor assembly 10 according to the present invention mounted to a roof 11 through a headliner 12 of a motor vehicle. The visor assembly 10 can be conventionally rotated and pivoted between a raised, stored position against the vehicle headliner 12, as illustrated in FIG. 1, and a lowered position adjacent a side window 13 of the vehicle, as shown in FIG. 2. The visor assembly 10 can also be laterally adjusted, as illustrated by arrow A in FIG. 2, for providing optimum sun blocking. The visor assembly 10 comprises a visor body 14, a support arm 16 and an anti-backlash device 18. The visor body 14 has a core 20 made of any suitable material, such as fiberboard or polymeric material, and a cover material 22 which is placed over the core. The cover material 22 may be fabric, vinyl, leather, or any other suitable material.

Figure 3:
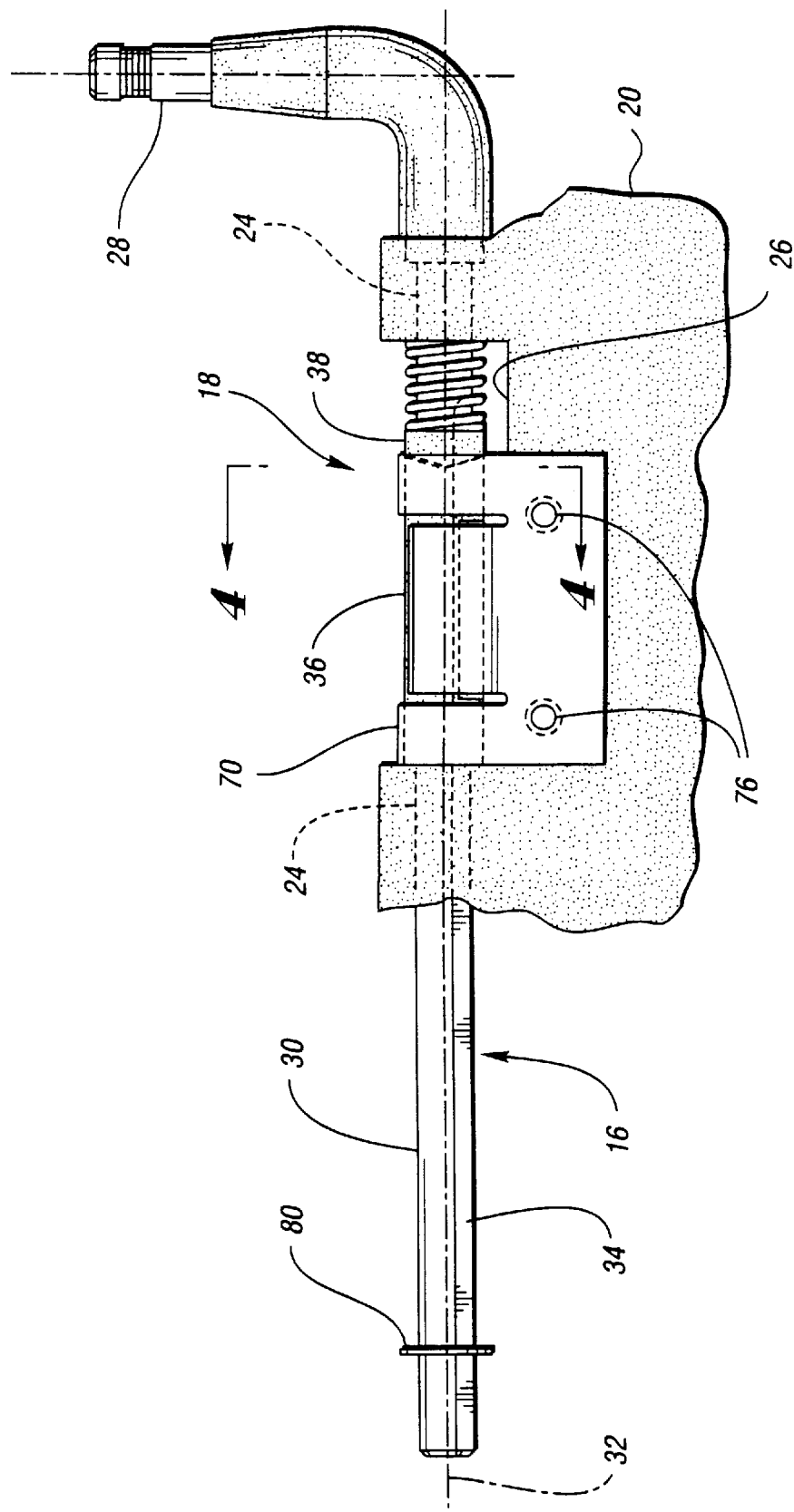
FIG. 3 is an enlarged front-elevational view of the sun visor assembly with a visor body broken away to show an anti-backlash device.
Figure 4:
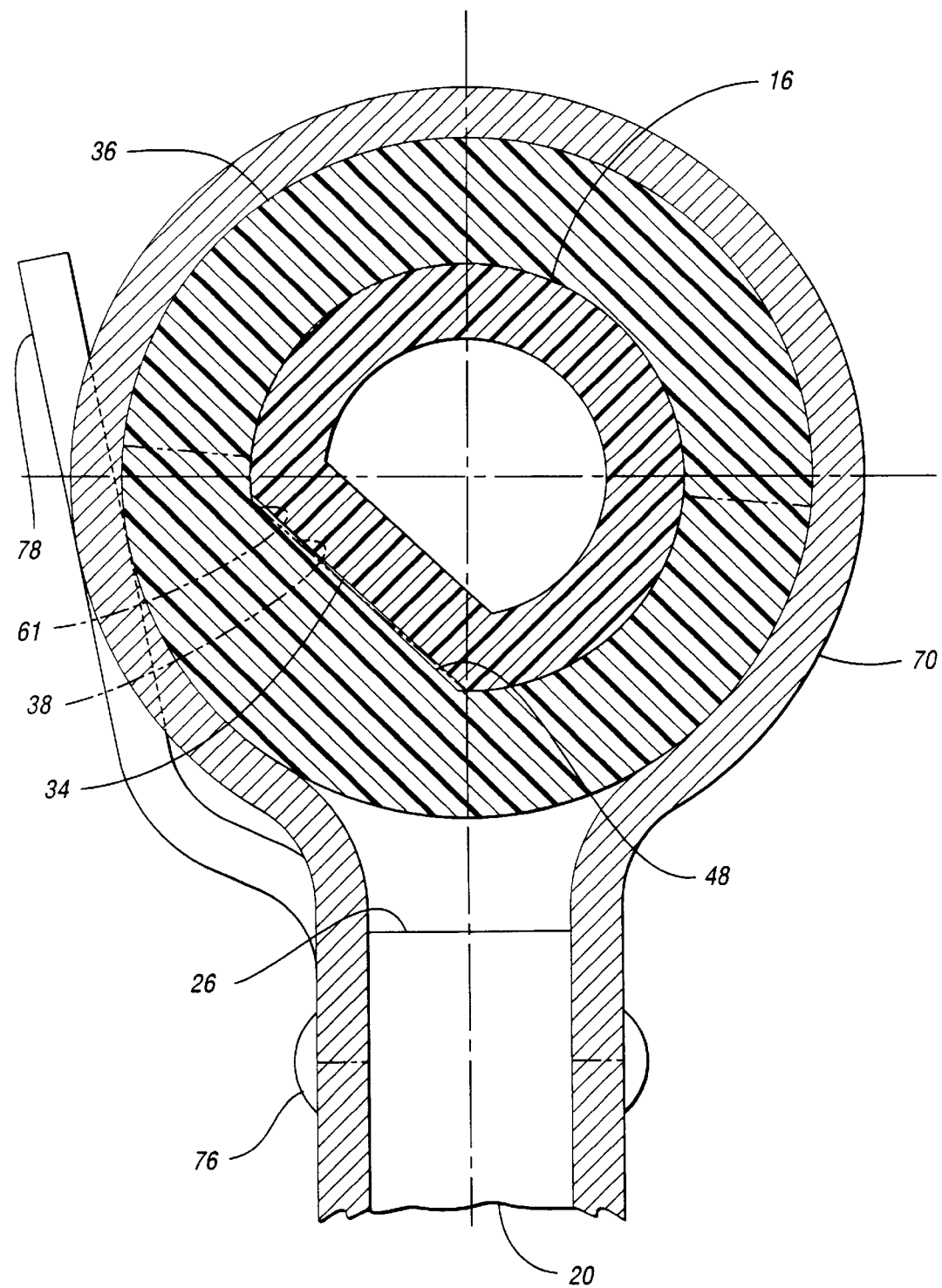
FIG. 4 is an enlarged cross-sectional view of the sun visor assembly taken on line 4—4 of FIG. 3 in the direction of the arrows.

As shown in FIGS. 3 and 4, the core 20 has a pair of passageways 24 to receive the support arm 16, and a cut-out portion 26 to receive the anti-backlash device 18. The support arm 16 is preferably generally L-shaped, with first and second ends 28 and 30, respectively. The first end 28 may be mounted to the roof 11 or headliner 12 of the vehicle in any conventional manner. The second end 30 extends through the passageways 24 of the visor core 20, and has an axis 32 about which the core and visor body 14 may rotate. A generally flat surface 34 extends a substantial length of the support arm 16.

FIGS. 5 through 7 show the anti-backlash device 18 including first and second bushings 36 and 38, respectively. A first end surface 40 of the first bushing 36 is engageable with the visor core 20, and a second end surface 42 of the bushing 36 preferably defines a V-shaped notch 43. The first bushing 36 further has an inner surface which defines a passageway or bore 46 to slidably receive the second end 30 of the support arm 16. The inner surface of the bushing 36 preferably has a flat portion 48 that is engageable with the flat surface 34 of the support arm 16. The first bushing 36 also has a generally cylindrical external surface 50 with a recessed, generally flat surface 52.

The second bushing 38 of the anti-backlash device 18 has opposite end surfaces 54 and 56. The first end surface 54 preferably defines a V-shaped projection 55 which is displacably engageable with the V-shaped notch 43 of the first bushing 36. The second bushing 38 also has an inner surface which defines a passageway or bore 60 to receive the second end 30 of the support arm 16, as shown in FIG. 7. The inner surface of the bushing 38 preferably has a flat portion 61 that is engageable with the flat surface 34 of the support arm 16. The first and second bushings 36 and 38 are configured such that when the flat portions 48 and 61 are aligned, the end surfaces 42 and 54 are misaligned with respect to each other and the projection 55 does not fit entirely within the notch 43. When this occurs, a low point 62 of the notch 43 defines an angle $\alpha$ to the vertical axis as shown in FIG. 6, and a high point 63 of the projection 55 defines an angle $\beta$ to the vertical axis as shown in FIG. 7. In the preferred embodiment, the difference between $\alpha$ and $\beta$ is roughly 6 degrees.

The anti-backlash device 18 also includes a spring means, such as a conventional coil spring 64. A first end 66 of the coil spring 64 is engageable with the second end surface 56 of the second bushing 38, and a second end 68 of the coil spring is engageable with the visor core 20 to bias the bushings 36 and 38 together. A detent clip 70 preferably surrounds the first bushing 36. The detent clip 70 has flange portions 72 and 74 which may be fastened to the visor core 20 using any suitable fasteners, such as compression rivets 76 as shown in FIG. 3. The detent clip 70 also includes a tab 78 which is compressively engageable with the cylindrical external surface 50 and the recessed surface 52 of the first bushing 36.

To assemble the sun visor assembly 10, the first bushing 36 is inserted into the detent clip 70 until the recessed surface 52 is aligned with the tab 78. The detent clip 70 is then fastened to the visor core 20 of the visor body 14. Next, the support arm 16 is inserted into the passageway 24 of the visor core 20 until the second end 30 enters the cut-out portion 26 of the visor core. The coil spring 64 is then placed over the second end 30 of the support arm 16, and the spring is compressed to allow the second bushing 38 to be placed between the spring and the first bushing 36.

The first and second bushings 36 and 38 are then rotated to align the flat portions 48 and 61, which causes the end surfaces 42 and 54 to misalign. Next, the support arm 16 is oriented such that its flat surface 34 is sufficiently parallel with the flat portions 48 and 61. The second end 30 of the support arm 16 is then inserted through the first and second bushing 36 and 38.

The spring 64 is then released to apply a compressive force to the second end surface 56 of the second bushing 38. The compressive force biases together the end surfaces 42 and 54 of the bushings 36 and 38, and urges the end surfaces to align, thereby producing a counter-rotational force in each of the bushings. This causes the flat portions 48 and 61 to misalign and to engage opposite sides of the flat surface 34 of the support arm 16, as shown in FIG. 4, thereby applying a clamping force on the support arm.

When the visor body 14 is rotated about the support arm axis 32, the detent clip 70 and the first bushing 36 rotate with the visor body until the flat portion 48 of the first bushing 36 engages one side of the flat surface 34 of the support arm 16. If the visor body 14 is further rotated, the detent clip 70 rotates about the first bushing 36, and the tab 78 engages either the cylindrical external surface 50 or the recessed surface 52, depending on the pivotal orientation of the visor body.

When the visor body 14 is sufficiently rotated about the support arm axis 32 in a direction opposite the rotational force produced in the first bushing 36 by the spring 64, the detent clip 70 and the first bushing 36 similarly rotate. As a result, the end surface 42 of the first bushing 36 rotates with respect to the end surface 54 of the second bushing 38, thereby further misaligning the end surfaces. This rotational movement causes the second bushing 38 to move away from the first bushing 36 and to further compress the coil spring 64. This rotational movement also sufficiently aligns the flat portions 48 and 61, thus releasing the clamping force from the support arm 16. The visor body 14 may then be laterally adjusted with minimal effort along the support arm 16 as illustrated by arrow A in FIG. 2. A compression washer 80, or any other suitable device, is preferably placed on the support arm 16 axially away from the anti-backlash device 18, as shown in FIG. 3, to provide a stopping point for lateral adjustment of the visor body 14. When the pivotal torque on the visor body 14 is released, the clamping force will be reapplied to the support arm 16 in the manner previously described.

Because the anti-backlash device 18 enables the clamping force to be selectively applied on and released from the support arm 16, the anti-backlash device can be configured such that the clamping force is relatively large, thereby effectively preventing side play and flutter of the visor body 14 during operation of the vehicle. Furthermore, because the anti-backlash device 18 includes a spring means such as the coil spring 64, the anti-backlash device 18 can compensate for a relatively large tolerance fit between the support arm 16 and the first and second bushings 36 and 38, and the anti-backlash device can self-adjust to compensate for any tolerance variation that occurs during use of the sun visor assembly 10.

The invention has been described in an illustrative manner, and it is to be understood that the terminology which has been used is intended to be in the nature of words of description rather than of limitation. Obviously, many modifications and variations of the invention are possible in light of the above teachings. It is, therefore, to be understood that within the scope of the appended claims, the invention may be practiced otherwise than as specifically described.

What is claimed is:

1. A sun visor assembly for a vehicle, the assembly comprising:

a visor body;

a support arm having first and second ends, said first end being adapted to cooperate with the vehicle; and an anti-backlash device supporting said visor body and slidably engageable with said second end of said support arm, said anti-backlash device including first and second members, each having an inner surface misalignable with each other for selectively providing a clamping force on said second end of said support arm when said inner surfaces are misaligned;

wherein sufficient rotational movement of said visor body about said support arm sufficiently releases said clamping force of said anti-backlash device by sufficiently aligning said inner surfaces, such that said visor body may slide along said second end of said support arm.

2. The sun visor assembly of claim 1 wherein said anti-backlash device further includes a detent connected to said visor body and rotatably cooperable with said support arm to releasably slidably hold said visor body in a desired pivotal orientation.

3. The sun visor assembly of claim 1 wherein each of said first and second members includes an inner surface portion of said inner surface misalignable with each other.

4. The sun visor assembly of claim 1 wherein said first and second members are bushings, each bushing having an end surface misalignable and engageable with each other, and an inner surface portion of said inner surface alignable with each other and slidably engageable with said second end of said support arm.

5. The sun visor assembly of claim 4 wherein when said inner surface portions are aligned with each other, said end surfaces are misaligned.

6. The sun visor assembly of claim 5 further including a spring means biasing said end surfaces together for urging said end surfaces to align, thereby causing said inner surface portions to misalign and to apply said clamping force on said support arm.

7. The sun visor assembly of claim 6 wherein sufficient rotational movement of one of said bushings against the bias of said spring sufficiently aligns said inner surface portions of said bushings, whereby to sufficiently release said clamping force on said support arm such that said visor body may slide along said support arm.

8. A sun visor assembly for a vehicle, the assembly comprising:

a visor body;

a support arm having first and second ends, said first end being adapted to cooperate with the vehicle;

an anti-backlash device for selectively applying a clamping force on said second end of said support arm and including:

first and second bushings, each having an end surface misalignable and engageable with each other, and an inner surface portion alignable with each other and slidably engageable with said second end of said support arm, one of said bushings supporting said visor body, wherein when said inner surface portions are aligned with each other said end surfaces are misaligned;

a detent connected to said visor body and rotatably cooperable with one of said bushings to releasably slidably hold said visor body in a desired pivotal orientation; and a spring means biasing said end surfaces together for urging said end surfaces to align, thereby causing said inner surface portions to misalign and to apply a clamping force on said support arm;

wherein sufficient rotational movement of one of said bushings against the bias of said spring sufficiently realigns said inner surface portions, whereby to sufficiently release said clamping force on said support arm such that said visor body may slide along said support arm.

9. An anti-backlash device adapted to support a visor body and further adapted to slidably engage a support arm, the anti-backlash device comprising first and second members each having an engaging surface misalignable with each other for selectively providing a clamping force on the support arm when said engaging surfaces are misaligned.

10. The anti-backlash device of claim 9 wherein sufficient rotational movement of the visor body about the support arm sufficiently releases said clamping force on the support arm by sufficiently aligning said engaging surfaces, such that the visor body may slide along the support arm.

11. The anti-backlash device of claim 9 further including a detent adapted to be connected to the visor body and adapted to rotatably cooperate with the support arm to releasably slidably hold the visor body in a desired pivotal orientation.

12. The anti-backlash device of claim 9 wherein said first and second members are bushings, each bushing having an end surface misalignable with each other, and including one of said engaging surfaces as an inner surface portion alignable with each other and slidably engageable with the support arm.

13. The anti-backlash device of claim 12 wherein when said inner surface portions are aligned with each other, said end surfaces are misaligned.

14. The anti-backlash device of claim 13 further including a spring means biasing said end surfaces together for urging said end surfaces to align, thereby causing said inner surface portions to misalign and to apply said clamping force on the support arm.

15. The anti-backlash device of claim 14 wherein sufficient rotational movement of one of said bushings against the bias of said spring sufficiently realigns said inner surface portions of said bushings, whereby to sufficiently release said clamping force on the support arm such that the visor body may slide along the support arm.

16. An anti-backlash device adapted to support a visor body and further adapted to slidably engage a support arm, the anti-backlash device comprising:

first and second bushings, each having an end surface misalignable and engageable with each other, and an inner surface portion alignable with each other and adapted to be slidably engageable with the support arm, one of said bushings being adapted to support the visor body, wherein when said inner surface portions are aligned with each other said end surfaces are misaligned;

a detent adapted to be connected to the visor body and rotatably cooperable with one of said bushings to releasably slidably hold the visor body in a desired pivotal orientation; and a spring means biasing said end surfaces together for urging said end surfaces to align, thereby causing said inner surface portions to misalign and to apply a clamping force on the support arm;

wherein a sufficient rotational movement of one of said bushings against the bias of said spring sufficiently realigns said inner surface portions of said first and second bushings, whereby to sufficiently release said clamping force on the support arm such that the visor body may slide along the support arm.

* * * * *